United States Patent [19]

Kamo et al.

[11] 4,222,081
[45] Sep. 9, 1980

[54] INFORMATION READING DEVICE FOR A MULTITRACK STORAGE DEVICE

[75] Inventors: Yoshihisa Kamo; Zenji Tsutsumi, both of Kokubunji; Hiroshi Maejima, Kanagawa, all of Japan

[73] Assignee: Hitachi, Ltd., Japan

[21] Appl. No.: 962,767

[22] Filed: Nov. 21, 1978

[30] Foreign Application Priority Data

Nov. 21, 1977 [JP] Japan ............................ 52-155442[U]

[51] Int. Cl.² .......................... G11B 5/02; G11B 15/12
[52] U.S. Cl. ............................................. 360/67; 360/63
[58] Field of Search ........................ 360/39, 46, 67, 31, 360/63

[56] References Cited

U.S. PATENT DOCUMENTS

| | | | |
|---|---|---|---|
| 3,660,821 | 5/1972 | Weber et al. | 360/67 |
| 3,662,365 | 5/1972 | Rodriguez et al. | 360/67 |
| 3,879,674 | 4/1975 | Dragon | 360/67 |
| 4,091,380 | 5/1978 | Yu | 360/67 |

Primary Examiner—Vincent P. Canney
Attorney, Agent, or Firm—Craig & Antonelli

[57] ABSTRACT

The difference between the two gain control signals for two amplifiers which correspond to two of a plurality of read heads which have the maximum and minimum output levels is detected. Whether or not the difference exceeds a predetermined value indicates an abnormality of the outputs of the read heads due to dust adhering thereto.

5 Claims, 16 Drawing Figures

INFORMATION READING DEVICE FOR A MULTITRACK STORAGE DEVICE

BACKGROUND OF THE INVENTION

The present invention relates to an information reading device for a multitrack storage device such as a magnetic tape memory and it especially relates to an information reading device having an automatic gain control amplifier.

In a magnetic tape memory, for example, a plurality of read heads are provided in correspondence with a plurality of information storage tracks. On each of these tracks there is recorded a signal for controlling the gain of a corresponding amplifier connected to the read head. This signal is called an automatic read amplification (ARA) burst. The ARA burst region is followed by a region for storing data to be used by users. When the tape begins to be read, the ARA bursts in the tracks are read out before the data are read and the signals provided by the read heads are amplified by corresponding amplifiers whose gains are controlled automatically, so that the signals provided by the respective amplifiers may be maintained at a predetermined value. Thus, the gains of the respective amplifiers are determined by using the ARA bursts. The data following the ARA bursts in the respective tracks are read out by the corresponding amplifiers whose gains are thus determined.

It is to be noted, however, that the gains of some of the amplifiers reach abnormally high values in some cases.

For example, the ARA burst for one of the tracks may be recorded with a signal level substantially less than a normal signal level because of dust adhering to a corresponding one of the write heads, while the ARA bursts for the other tracks may be recorded at a normal signal level. The dust may be removed from the write head when data is recorded by the write head resulting in the signal level of the recorded data being at the normal level.

When the ARA burst recorded by a write head with foreign matter, such as dust adhering thereto, is read out by a read head without dust adhering thereto, the signal level provided by the read head is quite small and, therefore, the gain of the amplifier connected to the read head is increased to an abnormally high value which is too large to amplify the read out data which is recorded at a normal level, resulting in the signal waveform for the read out data being distorted by the amplifier.

In another case, the ARA burst and the data for one of the tracks may be recorded at a normal level. The signal level of the ARA burst read out by the read head may be quite small if dust adheres to the read head. The dust adhering to the read head may be removed when the data following the ARA burst is read out by the read head, and the read out data signal level is at a normal level, resulting in the gain of the amplifier being too large to amplify the data signal at the normal level without waveform distortion. The distortion of the waveform of the data signal results in incorrect detection of the data.

Therefore, an abnormally high gain of an amplifier connected to a read head must be avoided.

LIST OF THE PRIOR ART (37 CFR 1.56(a))

The following reference is cited to show the state of the prior art: U.S. Pat. No. 3,464,022.

SUMMARY OF THE INVENTION:

It is an object of the present invention to detect the abnormality of the gains of amplifiers connected to read heads.

It is another object of the present invention to avoid incorrect detection of data due to the abnormality of the gains of the amplifiers.

It is a further object of the present invention to avoid incorrect detection of data due to dust adhering to the read heads.

In order to attain these objects, an information reading device according to the present invention utilizes the fact that all the signals provided by the plurality of read heads are not extremely small at the same time except in rare cases. In most cases, one or a few of the read heads may be degraded by foreign matter, such as dust attached thereto, and the other read heads are not degraded by dust.

An information reading device according to the present invention comprises means for detecting the difference between the maximum and the minimum of the gain control signals to be provided to the plurality of amplifiers connected to respective read heads and means for detecting whether or not the difference exceeds a predetermined value.

DETAILED DESCRIPTION OF THE PREFERRED EMBODIMENT

Figures 1, 2:
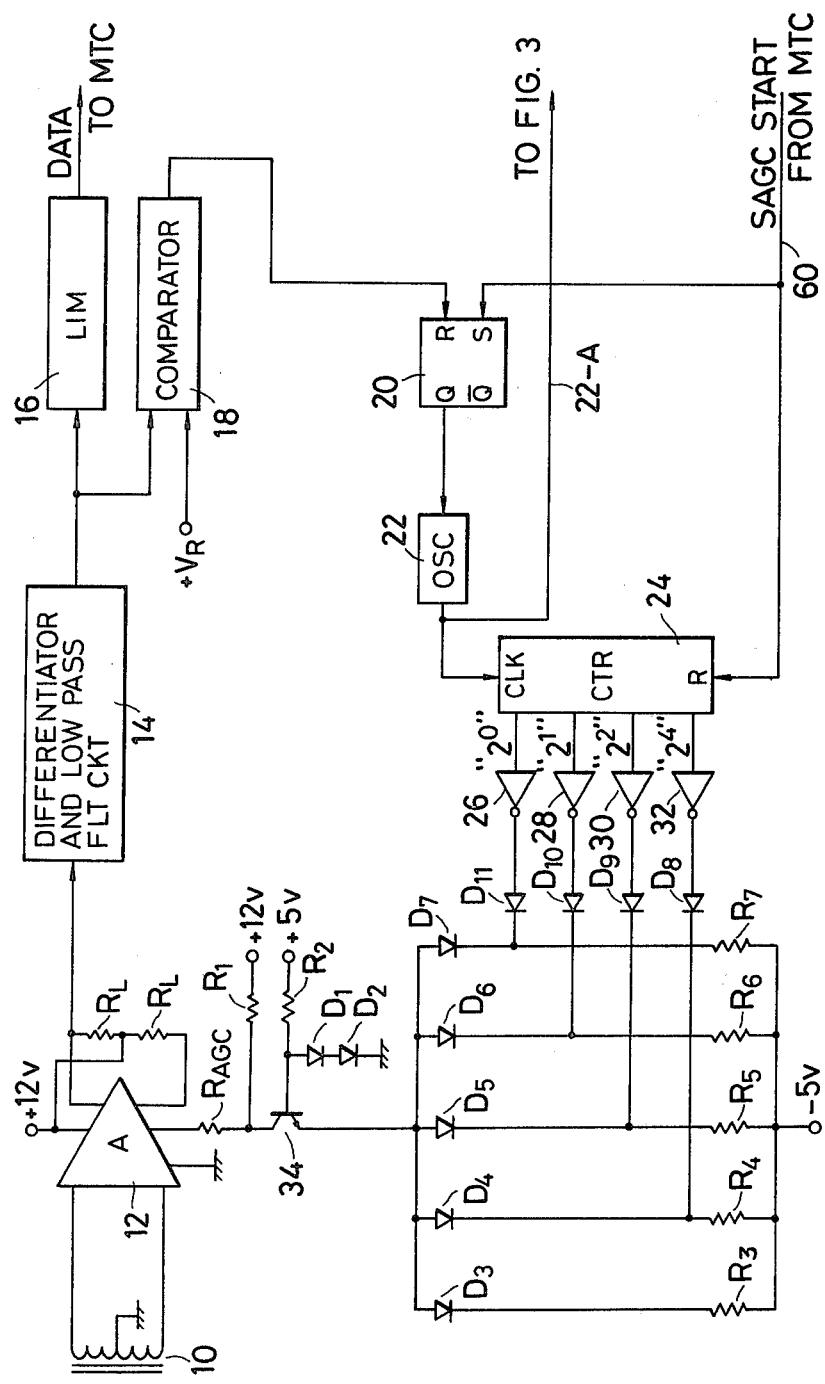
FIG. 1 shows various signal regions of a recording medium pertinent to the present invention.
FIG. 2 shows a block circuit diagram of the first part of the embodiment of the present invention.

Referring to FIG. 1, a magnetic tape 1 for a high density recording such as 6250 BPI comprises nine tracks of data region 2. The tape 1 is driven in the direction shown by an arrow 4 past nine write heads and nine read heads (not shown). The tape 1 further comprises a region 6 marking the beginning of tape and a region 8 for automatic read amplification (ARA) bursts between the regions 2 and 6. The ARA bursts comprise all "1"s data recorded in all nine tracks.

A circuit shown in FIG. 2 is provided for each of the tracks. The output of a read head 10 is amplified by a gain controllable amplifier 12 and the output of the amplifier 12 is differentiated and filtered by a differentiator and low pass filter circuit 14. The analog output of the circuit 14 is converted by a limiter 16 to digital data, which is delivered to a magnetic tape controller (not shown).

The gain of the amplifier 12 is dependent upon the voltage of the collector of a transistor 34. The amplifier 12 may be comprised of a commercially available Motorola gain control amplifier, type MC1590G. The transistor 34, diodes $D_1$ through $D_{11}$, resistances $R_{AGC}$ and $R_1$ through $R_7$, and inverters 26, 28, 30, and 32 form a circuit for converting the digital outputs of a four-bit counter 24 to a corresponding gain control voltage for the amplifier 12. When one of the four binary outputs of the counter 24, for example the fourth output, is high, the output of a correspoonding inverter 32 is low, resulting in diodes $D_4$ and $D_8$ becoming conductive and nonconductive, respectively, and allows the transistor 34 to supply current determined by the resistor $R_4$. When the fourth output is low, the output of the inverter 32 is high, resulting in diodes $D_4$ and $D_8$ becoming nonconductive and conductive, respectively. The situation is the same for the other binary outputs of the counter 24 and for the diodes $D_5$ through $D_7$ and $D_9$ through $D_{11}$. The resistors $R_4$ through $R_7$ have resistance values 8R, 4R, 2R, and R, respectively, where R is 1KΩ. Thus, the current flow through the transistor 34 is dependent on the digital outputs of the counter 24. The diode $D_3$ is always conductive and allows the transistor 34 to supply a current determined by the resistor $R_3$, whose resistance value is, for example, 8.2KΩ. The current provided by the diode $D_3$ determines the minimum gain of the amplifier 12, which is the case when the digital outputs of the counter 24 are all zeros. The resistance values of the resistors $R_1$, $R_2$, $R_L$, and $R_{AGC}$ are, for example, 470 Ω, 820 Ω, 510Ω, and 82KΩ, respectively.

When the magnetic tape controller detects the mark 6 indicating the beginning of the tape, it provides a self-adjusting gain control (SAGC) start signal on line 60. The SAGC start signal sets a flip-flop 20 and resets the four-bit counter 24, resulting in the amplifier 12 having a minimum gain. The ARA burst read out by the read head 10 is amplified by the amplifier 12 and supplied to the circuit 14. As the ARA burst stored in the tape 1 comprises all "1"s data and the output of the amplifier 12 for the ARA burst is almost sinusoidal, the output of the circuit 14 is also sinusoidal and its amplitude is proportional to the amplitude of the output of the amplifier 12. The output of the circuit 14 is supplied to a comparator 18, which compares the peak amplitude of the output of the circuit 14 and a reference volatage $V_R$. When the flip-flop 20 is set by the SAGC start pulse, the high level output of the flip-flop 20 triggers an oscillator 22 which provides a clock signal of frequency 1.25KHz. The clock signal provided by the oscillator 22 increments the counter 24 resulting in the gain of the amplifier 12 being increased.

When the gain of the amplifier 12 is not high enough, the comparator 18 provides a low level signal and the flip-flop 20 remains set, resulting in oscillator 22 providing the clock signal and the gain of the amplifier 12 is increased step-by-step at a frequency of 1.25KHz.

When the gain of the amplifier 12 is sufficiently high and the peak amplitude of the output signal of the circuit 14 is equal to or greater than the voltage $V_R$, the comparator 18 provides a high level signal to reset the flip-flop 20. The oscillator 22 stops providing the clock signal in response to the low level signal provided by the flip-flop 20. The counter 24 is no longer incremented and the gain of the amplifier 12 remains fixed. The data 2 is then read out of the tape 1, amplified by the amplifier 12 with its gain thus fixed and sent to the limiter by way of the circuit 14. The limiter 16 converts the analog output of the circuit 14 to digital data to be sent to the magnetic tape controller. Thus, the read out operation of one track is now completed.

The same operation is carried out with the remaining tracks at the same time. The gains of the amplifiers for all tracks are thus individually fixed and may be different. The output of the oscillator 22 is supplied to a circuit of FIG. 3 by way of a line 22-A during the read out operation.

Figure 3:
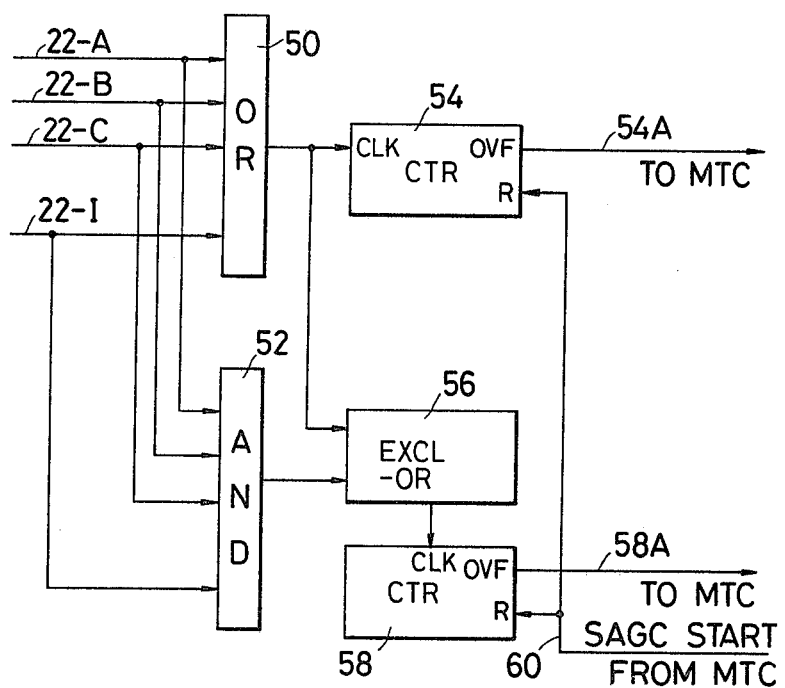
FIG. 3 shows a block circuit diagram of the second part of the embodiment of the present invention.

Referring to FIG. 3, an OR gate 50 and an AND gate 52 receive the output of the oscillator 22 on the line 22-A, as well as the outputs of the oscillators (not shown) for the other eight tracks on lines 22B to 22I. These nine oscillators provide the clock signals of a frequency 1.25KHz synchronously.

Figure 4A:
FIGS. 4A through 4M show various pulses used in the circuits in FIGS. 2 and 3.
Figure 4B:
Figure 4C:
Figure 4D:
Figure 4E:
Figure 4F:
Figure 4G:
Figure 4H:
Figure 4I:
Figure 4J:

FIG. 4A through 4I respectively show examples of the nine outputs of these oscillators for the first to ninth tracks. FIG. 4J shows the SAGC start pulse as a reference. In the above example, it is assumed that the ARA bursts provided by the read heads for the fourth and eighth tracks have respective minimum and maximum amplitudes.

Figure 4K:
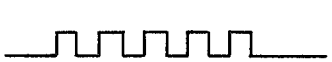
Figure 4L:

The outputs of the OR gate 50 and the AND gate 52 are shown in FIGS. 4K and 4L, respectively. A four-bit counter 54 and a three-bit counter 58 are reset by the SAGC start pulse on the line 60. The output of the OR gate 50 increments counter 56 which stores, in this example, data representing the number five which is equal to the maximum number of pulses on the line 22-A through line 22-I. When the counter 54 overflows, an overflow signal is sent to the magnetic tape controller by a line 54A. The outputs of the OR gate 50 and AND gate 52 are supplied to an Exclusive-OR gate 56, which provides pulses whose numbers are equal to the difference between the numbers of the output pulses of the OR gate 50 and AND gate 52.

Figure 4M:
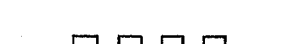

FIG. 4M shows an example of the outpul pulses of the gate 56 equal to four pulses, in this example. The output pulses of the gate 56 increment three-bit counter 58 which provides an overflow signal when the number of the output pulses of the gate 56 exceeds seven. The overflow signal provided by the counter 58 is delivered to the magnetic tape controller which, in response to this signal, stops reading the tape 1 and rewrites or rereads the ARA burst in all tracks. Otherwise, the controller switches on a lamp to give an alarm to the operator.

Thus, the overflow signal of the counter 58 indicates the difference between the two gain control signals which correspond to two read heads which have the maximum and minimum outputs and, as a result, an abnormality in the gains of the amplifiers can be detected.

While we have shown and described one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What is claimed:

1. An information reading device for a multitrack storage device which stores in each of a plurality of tracks a reference signal and data comprising:
   a plurality of read heads respectively provided in correspondence with each of the plurality of tracks;
   a plurality of variable gain amplifiers respectively connected to each of said read heads;
   a plurality of first means respectively connected to each of said read heads for respectively providing gain control signals to corresponding amplifiers in response to outputs of corresponding read heads so that the outputs of said corresponding read heads reach a predetermined value when said corresponding read heads read corresponding reference signals from the storage device;

second and third means, connected to said plurality of first means, for detecting first and second gain control signals, respectively corresponding to first and second ones of said read heads whose gains are respectively the maximum and minimum values; and fourth means, connected to said second and third means, for detecting whether or not the difference between said first and second gain control signals exceeds a predetermined value.

2. An information reading device according to claim 1, wherein:

each of said first means comprises means, connected to a corresponding one of said amplifiers, for comparing the output of said corresponding amplifier with a determined signal; and means for supplying to said corresponding amplifier a gain control signal for maintaining coincidence between the output of said corresponding amplifier and said predetermined signal.

3. An information reading device according to claim 2, wherein;

each of said signal providing means in each of said first means includes means for generating a plurality of periodic pulses as long as the output of said corresponding amplifier is less than said predetermined value; and further including means for increasing the gain of each of said amplifiers in response to the pulses provided by corresponding one of said first means.

4. An informaton recording device according to claim 3, wherein:

said second and third means include means for detecting the largest and smalles numbers, respectively, among numbers of pulses provided by respective first means; and said fourth means includes means for detecting whether or not the difference between the largest and smallest numbers exceeds a predetermined number.

5. An information recording device according to claim 4, wherein:

said plurality of signal providing means respectively in said plurality of first means provide said pulses in synchronism with each other;

said second means comprises OR gate means connected to said plurality of signal providing means;

said third means comprises AND gate means connected to said plurality of signal providing means; and said fourth means comprises exclusive-OR gate means connected to said OR gate means and said AND gate means, and counter means, connected to said exclusive-OR gate means, for counting the number of pulses provided by said exclusive-OR gate means and providing a signal when said counted number exceeds a predetermined number.

* * * * *